(12) United States Patent
Baumann

(10) Patent No.: US 7,274,003 B2
(45) Date of Patent: Sep. 25, 2007

(54) GRILL UNIT FOR USE ESPECIALLY IN COMMERCIAL KITCHENS

(75) Inventor: Udo Baumann, Hamburg (DE)

(73) Assignee: Electrolux Professional GmbH, Hamburg (DE)

( * ) Notice: Subject to any disclaimer, the term of this patent is extended or adjusted under 35 U.S.C. 154(b) by 0 days.

(21) Appl. No.: 11/045,409

(22) Filed: Jan. 28, 2005

(65) Prior Publication Data
US 2005/0183583 A1    Aug. 25, 2005

(30) Foreign Application Priority Data
Feb. 18, 2004    (DE) .................... 10 2004 008 129

(51) Int. Cl.
| | |
|---|---|
| H05B 3/06 | (2006.01) |
| A47J 36/06 | (2006.01) |
| A47J 37/00 | (2006.01) |
| A47J 37/06 | (2006.01) |
| A47J 37/10 | (2006.01) |

(52) U.S. Cl. ................. 219/401; 219/385; 219/452.11; 219/524; 99/339; 99/349; 99/467; 99/482

(58) Field of Classification Search ................ 219/401, 219/386, 428, 429; 99/349, 339, 340, 413
See application file for complete search history.

(56) References Cited

U.S. PATENT DOCUMENTS

| | | | | |
|---|---|---|---|---|
| 4,512,250 A | * | 4/1985 | Schindler et al. | 99/425 |
| 5,363,748 A | * | 11/1994 | Boehm et al. | 99/372 |
| 5,931,083 A | * | 8/1999 | Stanger et al. | 99/349 |
| 5,943,949 A | * | 8/1999 | Sham et al. | 99/450 |
| 6,026,736 A | | 2/2000 | Turner | |
| 6,310,326 B1 | * | 10/2001 | Wang | 219/401 |
| 6,530,308 B1 | * | 3/2003 | Lin | 99/330 |
| 6,603,099 B2 | * | 8/2003 | Gouthiere | 219/432 |
| 7,007,592 B2 | * | 3/2006 | Citrynell et al. | 99/347 |

FOREIGN PATENT DOCUMENTS

| | | |
|---|---|---|
| DE | 25 57 058 | 6/1777 |
| DE | 698 03 546 T2 | 8/2002 |
| GB | 2 388 768 | 11/2003 |
| WO | WO 03/063665 A1 | 8/2003 |

* cited by examiner

*Primary Examiner*—Joseph Pelham
(74) *Attorney, Agent, or Firm*—Pearne & Gordon LLP

(57) ABSTRACT

A grill for use especially in commercial kitchens includes at least one electric heating element and, directly above said heating element, at least one food-product holder these components jointly forming a grill platform and said food-product holder featuring nozzles through which steam and/or hot water and/or seasoning can be sprayed.

11 Claims, 2 Drawing Sheets

GRILL UNIT FOR USE ESPECIALLY IN COMMERCIAL KITCHENS

BACKGROUND OF THE INVENTION (1) Field of the Invention

This invention relates to a grill unit for use especially in commercial kitchens.

(2) Description of Related Art

In commercial kitchens, food is typically grilled by the infrared or contact-heating method, whereby the food to be grilled is placed on a bottom-heated grate or plate, turned and ultimately seasoned by hand. The result may be a dry, overcooked and/or excessively seasoned product. Cleaning the grill grate or plate is a difficult chore.

BRIEF SUMMARY OF THE INVENTION

It is the objective of this invention to introduce improved grilling, seasoning and/or cleaning processes.

According to the invention this objective is achieved by means of the characterizing features specified in claim 1. Advantageous design enhancements are described in the subclaims.

The grill unit for use especially in commercial kitchens incorporates at least one electric heating element and at least one food-product holder situated directly above that heating element, these components jointly forming a grilling platform, with the product holder featuring nozzles through which steam and/or hot water and/or (liquid) seasoning and/or cleaning agents can be sprayed.

The minimum of one heating element and the minimum of one food-product holder are housed in a cooking chamber which, by means of a horizontally hinged lid, can be closed off, specifically in air-tight fashion. The lid is preferably equipped with at least one electric heating element and, in particular, at least one cover element directly above the heating element, which components jointly form a grilling platform, while said cover element features nozzles through which steam and/or hot water and/or (liquid) seasoning and/or cleaning agents can be sprayed.

The heating element is preferably a radiating heating element, in particular an infrared heating element, or a contact heating element. The food-product holder and/or the cover element is constituted of a grate or a plate which latter, for one example, may be in the form of a protective or reflective component. The nozzles essentially point downward but may also point in other directions. The lid may be provided with a safety valve for exhausting the steam or barbecue smoke.

The unit is preferably equipped with a sensor that detects the thickness of the food product and/or the distance between the heating element and the surface of the food product, as well as a control device by means of which the output of the heating element can be adjusted as a function of said thickness or distance.

The heating elements, together with the food product holder and/or the cover element, can be swiveled around a horizontal pivot out of their horizontal position or tilted outward away from to the lid.

The grill unit is equipped with a feeder system for supplying the steam and/or the hot water and/or the (liquid) seasoning, said system preferably including a hot-water and/or steam generator whose input port connects to at least one water pipe and/or one water reservoir while its output port connects to at least one pump or a compressor. On the input side the hot-water and/or steam generator may include a spice container, specifically a spice cartridge. A metering dispenser may be installed between the hot-water and/or steam generator and the spice container.

The feeder system may also be designed to include a first device for the stationary accommodation of the food product, a second device for collecting the droppings falling and/or liquids dripping from the product during the grilling process, a third device for separating the efflux into liquids and solids, a fourth device for distributing the liquid content and/or seasoning and/or cooking aids over or into the food product, and a fifth device for controlling said collection and/or separation and/or distribution process. The first device preferably includes at least one grate and/or one pan with at least one drain for the efflux which drain is either permanently open or can be opened in controlled fashion. The second device specifically includes a collector from which the droppings are gravity-fed to the third device, preferably after collecting the efflux directly from the first device and/or at the bottom of the grill unit. That bottom may itself be designed to serve as the collector. The third device includes a strainer that receives the efflux from the second device, as well as a pan underneath the strainer for holding the liquid component. That pan can selectably receive the liquid component and/or the seasoning and/or the cooking aids such as, specifically, oil and/or steam. The fourth device preferably includes at least one spray system above the first device and/or a skewer that can be inserted in the product, both connecting to the third device via a pump and a conduit assembly. The spray system and/or the skewer connect to the conduit assembly in detachable, preferably plug-in fashion.

Specifically, the spray system is arched over the first device. Preferably, it includes a horizontal first hollow tube that can be connected to the conduit assembly and is intersected by several mutually spaced second hollow tubes that are provided with nozzles pointing in the direction of the first device, and is designed to receive the liquid component and/or the seasoning and/or oil. The skewer is preferably designed to accept steam and/or seasoning and is equipped with a temperature and/or moisture sensor. The conduit assembly is preferably situated next to and/or behind the rear wall or one of the side walls of the grill unit. The fifth device includes supply, control, storage and indicator elements.

The following will explain this invention in more detail by way of an implementation example with the aid of the attached illustrations in which—

DETAILED DESCRIPTION OF THE INVENTION

Figure 1:
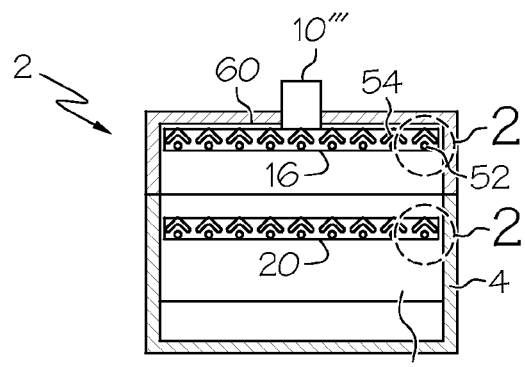
FIG. 1 is a cross-sectional view of the grill unit.
Figure 2:
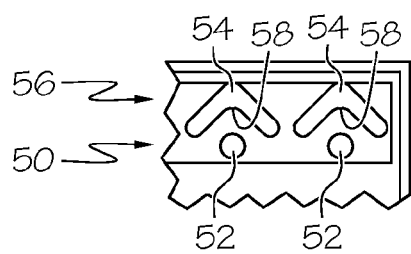
FIG. 2 is a detail illustration of the nozzles of the grill unit.
Figure 3:
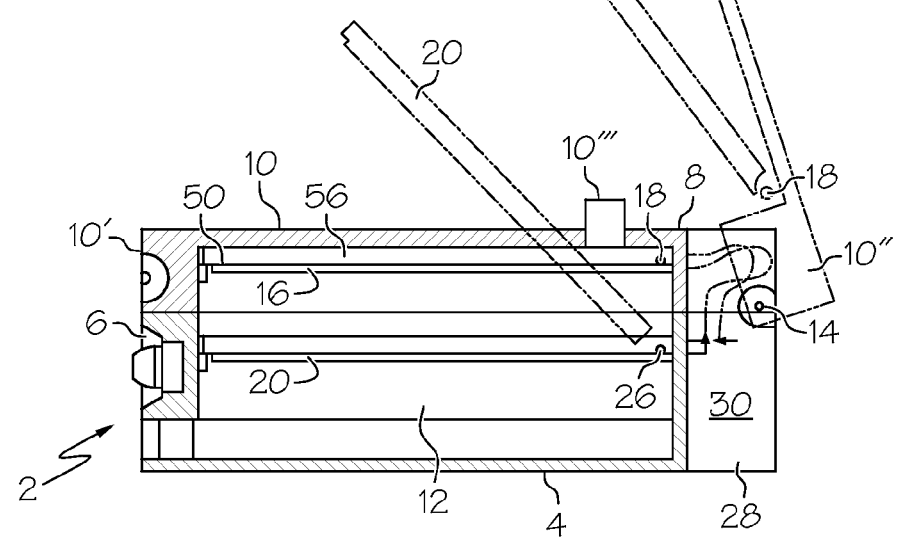
FIG. 3 is a longitudinal section view of the grill unit.
Figure 4:
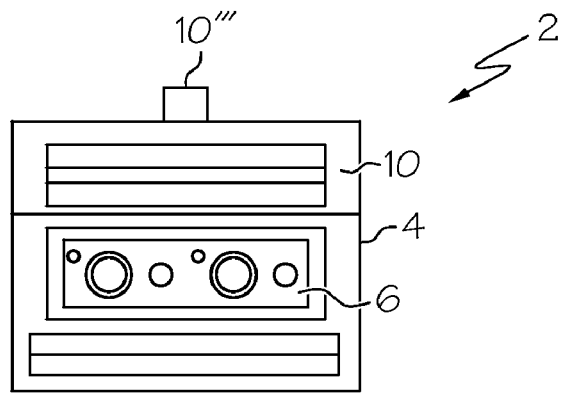
FIG. 4 is a front view of the grill unit.
Figure 5:
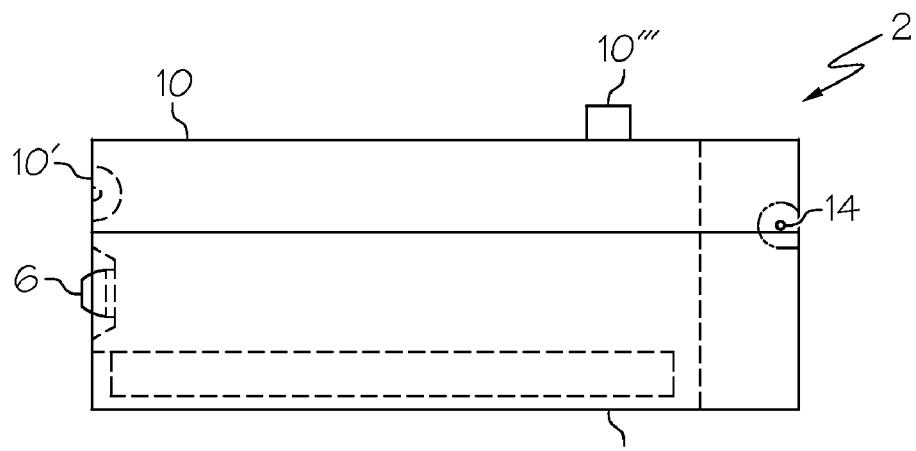
FIG. 5 is a longitudinal side view of the grill unit.
Figure 6:
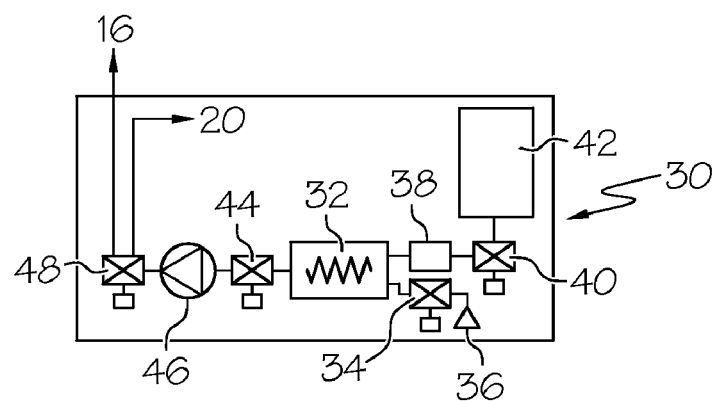
FIG. 6 is a block diagram of a steam, hot-water and spice feeder system.

The grill unit 2 incorporates a cubic enclosure 4 whose front end is provided with a control panel 6 while a lid 10 hinged on its rear end makes contact with a section of the front end. In its horizontal position the lid 10 closes off a grill chamber 12. Its pivot 14 extends parallel to the front and rear ends and perpendicular to the longitudinal sides of the enclosure 4. In its closed position a downward-pointing forward section 10' of the lid 10 is flush with a section of the front face of the enclosure 4 while a downward-pointing rearward section 10" of the lid, also serving as the lid mount, is flush with a section of the rear-end face of the enclosure 4.

The rear-end 8 of the lid supports a grilling platform 16 that can be tilted away from the open lid 10 in the direction of the grill chamber 12. Its horizontal pivot 18 extends parallel to the pivot 14 of the lid 10.

Halfway up inside the grill chamber 12 a grilling platform 20 is hinge-mounted on the rear end of the enclosure 4 while making contact with the front-end face of the enclosure 4. Its horizontal pivot extends parallel to the pivots 14 and 18 of the lid 10 and of the grill platform 16, respectively.

The length of the downward-pointing sections 10' and/or 10" of the lid 10 is so chosen that, when the lid 10 is open, the lower grill platform 20 is accessible at least from the front. However, the lid 10 could also be provided with downward-pointing lateral sections which, when the lid is open, would make the lower grill platform 20 accessible from the side as well. Finally, the lid 10 is also equipped with a steam valve 10'''.

The rear-end face of the enclosure 4 connects to a service area 28 that contains a seasoning and spray system 30 featuring a hot-water/steam generator 32 whose first intake port connects, via a solenoid valve 34, to a water pipe 36 while its second intake port connects, via a metering dispenser 38 and a solenoid valve 40, to a spice cartridge 42. The outlet of the hot-water/steam generator 32 leads via a solenoid valve 44 and a pump or compressor 46 to another solenoid valve 48 whose first output port leads to the upper grill platform 16, its second output port to the lower grill platform 20.

Each of the grill platforms 16 and 20 is provided with a tubular heating element 50 whose heating tubes 52 are covered by the roof-shaped reflecting sections 54 of a reflector 56. The underside of the ridge of the roof-shaped reflecting sections 54 incorporates nozzles 58 which, through the reflecting sections 54 or tubes extending through them, connect to the corresponding output ports of the solenoid valve 48.

The grill platforms 16 and/or 20 are individually equipped with a sensor 60 that detects the thickness of the food product or the distance between the tubular heating element 50 and the surface of the food product and includes a control system, not illustrated, by means of which the output of the tubular heating element 50 can be adjusted as a function of the thickness or distance detected.

The mode of operation is as follows:

With the lid 10 open, the food product to be grilled is placed on the reflector 56 of the lower grill platform 20 or on a trivet supported by the latter or on a product holder above it. Next, the lid is closed and the control panel 6 is used to set the cooking temperature and time and to select the grilling aids such as steam, hot water and liquid seasoning. Thereupon, when activated or when "automatic mode" is selected, the control system, not illustrated, will start a corresponding grilling program that appropriately controls the tubular heating elements and switches the solenoid valves based on the values provided by the sensor 60 on the thickness of the food product or its distance from the tubular heating element 50. Following the program thus established the spice and spray system 30 will now spray, through the nozzles 58 of the reflector 56, steam and/or hot water mixed, where appropriate, with (liquid) seasoning, creating the desired climate in the grill chamber. When the lid 10 closes in air-tight fashion and features a safety valve 10''', it is possible to substitute for pressure-free grilling a cooking process under (steam) pressure for instance at 0.5 or 1 bar.

When the lid 10 includes a grill platform 16, the food product can be grilled from the top as well without having to be turned over.

Upon expiration of the grill time or if and when other parameters terminate the grilling process, the lid 10 can be opened, permitting the grilled product to be easily removed from the front. The product will be juicy and will have lost less weight. The reflective grates or plates 56 and the tubular heating elements 50 can be cleaned more easily. The cleaning process is further facilitated by tilting the grill platform 16 upward and the grill platform 20 downward. A "steaming only" mode after the cooking provides a semiautomatic cleaning operation. In the case of separate selector circuits it is possible to inject a detergent instead of the seasoning.

The grill unit for commercial kitchens according to the invention, by sensing the thickness of the food product, prevents for instance excessive browning and eliminates grill fumes, thus permitting more wholesome grilling and roasting. The process is faster by virtue of two-sided and pressure cooking.

The invention claimed is:

1. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed, wherein the food-product holder includes one or more conduits extending therethrough to lead the steam and/or hot water and/or seasoning through the food-product holder to the nozzles, in which the minimum of one heating element and the minimum of one food-product holder are contained in a cooking chamber that can be closed off, especially in air-tight fashion, by means of a lid swivel-mounted on a horizontal pivot, and in which the lid is equipped with at least one electric heating element and, directly above said heating element, at least one cover element, said components jointly forming a grill platform, of which the cover element is provided with nozzles through which steam and/or hot water and/or seasoning and/or cleaning agents can be sprayed.

2. Grill unit as in claim 1, in which the food-product holder and/or the cover element is a grate or a plate covering the heating element and designed as a reflector.

3. Grill unit as in claim 1, in which the heating elements jointly with the food-product holder and/or cover element can be tilted, around a horizontal pivot, out of a horizontal position or away from the lid.

4. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed, wherein the food-product holder includes one or more conduits extending therethrough to lead the steam and/or hot water and/or seasoning through the food-product holder to the nozzles, wherein the steam and/or hot water and/or seasoning sprayed from the nozzles is sprayed towards the heating element.

5. Grill unit as in claim 4, in which the heating element is either a radiant heating element and in particular an infrared heating element, or a contact heating element.

6. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed, wherein the food-product holder includes one or more conduits extending therethrough to lead the steam and/or hot water and/or seasoning through the food-product holder to the nozzles, in which the nozzles are oriented in a downward direction.

7. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed, wherein the food-product holder includes one or more conduits extending therethrough to lead the steam and/or hot water and/or seasoning through the food-product holder to the nozzles, in which the minimum of one heating element and the minimum of one food-product holder are contained in a cooking chamber that can be closed off, especially in air-tight fashion, by means of a lid swivel-mounted on a horizontal pivot, and a safety valve primarily located in the lid.

8. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed; and a sensor serving to detect the thickness of the food product or the distance between the heating element and the surface of the food product, as well as a control system by means of which the output of the heating element can be adjusted as a function of the detected thickness or distance.

9. Grill unit for use especially in commercial kitchens, with at least one electric heating element and, directly above said heating element, at least one food-product holder, these components jointly forming a grill platform and said food-product holder featuring nozzles through which steam and/or hot water and/or seasoning can be sprayed, wherein the food-product holder includes one or more conduits extending therethrough to lead the steam and/or hot water and/or seasoning through the food-product holder to the nozzles, and the grill unit equipped with a feeder system that supplies steam and/or hot water and/or seasoning, in which the feeder system includes a hot-water and/or steam generator whose input port connects to at least one water line and/or water reservoir while its output port connects to at least one pump or compressor.

10. Grill unit as in claim 9, in which a spice container and especially a spice cartridge is provided on the input side of the hot-water and/or steam generator.

11. Grill unit as in claim 10, in which a metering dispenser is interpositioned between the hot-water and/or steam generator and the spice container.

* * * * *